United States Patent
Danton et al.

(10) Patent No.: US 8,612,892 B2
(45) Date of Patent: Dec. 17, 2013

(54) INCREMENTAL RUN-TIME LAYOUT COMPOSITION

(75) Inventors: Stephen M. Danton, Seattle, WA (US);
Yuri Rychikhin, Seattle, WA (US);
Jordan C. Sehn, Redmond, WA (US);
Scott M. Roberts, Bothell, WA (US);
Florian Voss, Seattle, WA (US);
Laurent Mollicone, Kirkland, WA (US);
William A. Manis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 12/487,253

(22) Filed: Jun. 18, 2009

(65) Prior Publication Data
US 2010/0325587 A1    Dec. 23, 2010

(51) Int. Cl.
*G06F 3/048*    (2013.01)
(52) U.S. Cl.
USPC ........... 715/853; 715/245; 715/253; 715/764; 715/770
(58) Field of Classification Search
USPC ......... 715/243, 244, 245, 253, 763, 764, 765, 715/766, 770, 788, 790, 853, 854, 863, 866
See application file for complete search history.

(56) References Cited

U.S. PATENT DOCUMENTS

| | | | |
|---|---|---|---|
| 7,096,454 B2 | 8/2006 | Damm | |
| 7,477,263 B2 * | 1/2009 | Saillet et al. | 345/619 |
| 2003/0018652 A1 * | 1/2003 | Heckerman et al. | 707/104.1 |
| 2005/0060647 A1 * | 3/2005 | Doan et al. | 715/514 |
| 2006/0117067 A1 | 6/2006 | Wright | |
| 2006/0235658 A1 * | 10/2006 | Nitta et al. | 703/2 |
| 2007/0089080 A1 * | 4/2007 | Sakuraba | 716/11 |
| 2008/0012859 A1 * | 1/2008 | Saillet et al. | 345/440 |
| 2009/0089299 A1 | 4/2009 | Flynn | |
| 2009/0089715 A1 * | 4/2009 | Dickey | 715/853 |
| 2009/0089739 A1 | 4/2009 | Mollicone | |
| 2009/0100084 A1 | 4/2009 | Jayadevan | |
| 2009/0106646 A1 | 4/2009 | Mollicone | |
| 2009/0228786 A1 * | 9/2009 | Danton et al. | 715/243 |

OTHER PUBLICATIONS

Osawa; "An Immersive Programming System: Ougi"—Dec. 4-6, 2002—pp. 1-8—http://vrsj.t.u-tokyo.ac.jp/ic-at/ICAT2003/papers/02036.pdf.
Smith; "Programming as an Experience: The Inspiration for Self"—2009—pp. 1-28—http://reference.kfupm.edu.sa/content/p/r/programming_as_an_experience_the_inspir_113161.pdf.
Author Unknown; "yEd Graph Editor 3.1.2"—Nov. 5, 2008—pp. 1-3—http://www.brothersoft.com/yed-graph-editor-187310.html.

* cited by examiner

*Primary Examiner* — Enrique Iturralde
(74) *Attorney, Agent, or Firm* — Workman Nydegger (57) ABSTRACT

Performing incremental runtime composition. A method includes a computing system receiving a user input gesture modifying a diagram displayed on a diagram surface. The diagram includes a first element, a second element, and a plurality of elements connected to the second element laid out in a particular layout pattern with respect to the second element. The method further includes interpreting the user input gesture to be a gesture creating a graph by connecting the first element to the second element of the diagram. The method further includes performing an auto layout of the diagram by automatically, and without user intervention, repositioning the second element with respect to the first element but without substantially repositioning the plurality of elements with respect to the second element by moving the second element and the plurality of elements as an atomic unit.

20 Claims, 5 Drawing Sheets

INCREMENTAL RUN-TIME LAYOUT COMPOSITION

BACKGROUND

Background and Relevant Art

Computers and computing systems have affected nearly every aspect of modern living. Computers are generally involved in work, recreation, healthcare, transportation, entertainment, household management, etc.

Computing systems can be used to model diagrams. For example, a computing system may be used to model a flow diagram, such as flow charts, graphs, trees, etc. Such diagrams include elements and connections. An element may be, for example, a shape, such as a box, circle, etc. Connections may be lines which may represent edges connecting the elements.

When a user interacting with a graphical user interface displaying an existing diagram modifies the existing diagram, auto-layout algorithms usually perturb the diagram. For example, adding or deleting a connection between two diagram elements can significantly change the layout of the elements and in extreme cases, make the diagram hardly recognizable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method that may be performed in a computing environment. The method includes acts for performing diagram layouts. The method includes a computing system receiving a user input gesture modifying a diagram displayed on a diagram surface. The diagram includes a first element, a second element, and a plurality of elements connected to the second element laid out in a particular layout pattern with respect to the second element. The method further includes interpreting the user input gesture to be a gesture creating a graph by connecting the first element to the second element of the diagram. The method further includes performing an auto layout of the diagram by automatically, and without user intervention, repositioning the second element with respect to the first element but without substantially repositioning the plurality of elements with respect to the second element by moving the second element and the plurality of elements as an atomic unit.

Some embodiments may further include receiving another user input gesture modifying the diagram displayed on a diagram surface, where the another user input gesture is interpreted to be a gesture dropping an element onto the diagram surface. The method may further include treating the element as a new vertex in a model space of the diagram surface and treating the element as a root vertex of a new directed tree in a view state space.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments minimize harmful diagram editing side effects caused by auto-layout algorithms by implementing actions whereby appropriate layout changes are automatically made to some elements based on changes to the overall diagram with minimal or no changes being made to elements related to changed elements, with respect to the changed elements. Some elements may be shapes. Additionally, an element may be referred to herein as a vertex of a graph.

Figure 1:
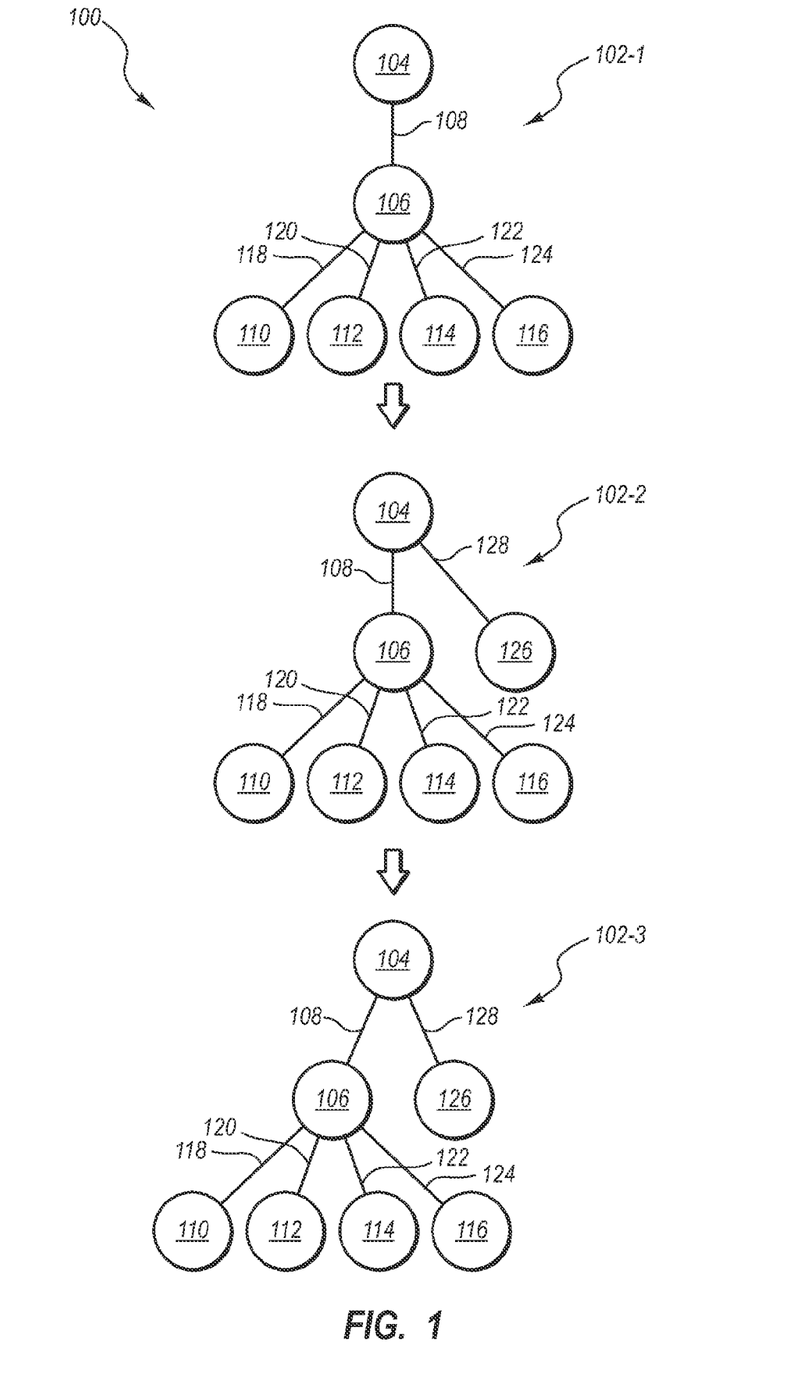
FIG. 1 illustrates a layout at various times along a time progression.

An example is illustrated in FIG. 1. FIG. 1 illustrates a diagram layout 102 illustrated at three distinct points in time as illustrated at 102-1, 102-2, and 102-3. At a first time, the diagram layout 102 includes a head element 104. Hierarchically below the head element 104 is a body element 106 connected to the head element through a connection 108. Connected to the body element 106 are four tail elements 110, 112, 114, and 116 connected to the body element 106 by connections 118, 120, 122, and 124 respectively. The layout illustrated at 102-1 might be what a user would see in a graphical user interface on a diagram surface for editing the layout 102-1.

A user may determine that they would like to add another body element below the head element 104. Thus, as illustrated at 102-2 the user makes two gestures, the first being dropping the body element 126 onto the diagram surface and the second being connecting the body element 126 to the head element 104 by the connection 128.

The auto-layout functionality of some embodiments will then determine that the layout, as defined by the user, does not fall within a predefined group of layouts, or is other wise a non-optimized layout. In particular, the element 104 has two child elements, 106 and 126, with one child element 106 directly below the head element 104 connected by a vertical connection 108 and the second child element 126 offset horizontally from the head element 104 and connected by an angled connection 128. The auto-layout functionality may determine that a more optimal arrangement is that the child elements 106 and 126 have an equal magnitude (but in opposite direction) horizontal offset from the head element 104. In particular, in one embodiment, layout rules and/or layout patterns may specify optimal or optimized layout arrangements, such as a pyramid, or isosceles triangle arrangement which has the equal horizontal offset as described above.

However, if the auto-layout functionality simply repositioned the body element 106 without consideration for elements directly related to the body element 106, then the child elements 110, 112, 114, and 116 to body element 106 would be positioned in an abnormal arrangement with respect to body element 106. Some embodiments described herein mitigate these issues by repositioning one or more second elements that are related to a repositioned first element such that the related second elements are in substantially the same position with respect to the repositioned first element as they were before the first element was repositioned. Thus, as shown at 102-3, the child elements 110, 112, 114, and 116 have substantially the same positioning with respect to body element 106 before the repositioning of the body element 106 as they have with respect to the body element 106 after the repositioning.

Illustrating now further details, in some examples, embodiments described herein leverage one or more of interpretation of user gestures, incremental view state construction, layout rules and layout patterns, and layout composition to localize and minimize the diagram editing effects or run-time composition of layout patterns.

When users create diagrams, they graphically drop shapes on a diagram surface of a graphical user interface and graphically connect shapes together in a certain order, incrementally increasing diagram complexity. This incremental process can be leveraged by interpreting and taking into account each user gesture. The information acquired by interpreting the gestures can be accumulated and used to progressively define layout types associated with every shape and how these layout types are composed at run-time. This information can also be preserved, such as in declarative form, and stored it in a layout view state. The view state may be implemented as a database which contains a textual representation of the layout. The textual representation includes information about the head and what may be referred to as the BodyTail which includes the body and the tail, where the head is a starting vertex of a layout, the body is one or more intermediate vertices and the tail is an end vertex of the layout. The Body can contain other bodies as well. This information along with a layout algorithm allows a computing system to determine the layout of the diagram from one run of the application to the next.

While the view state may be implemented using various storage schemes, using a database may be useful because the layout can be preserved from one instance of an application (or diagram) to the next. Also, it potentially allows layout changes to easily be shared by multiple users who have access to the same database.

Figure 2:
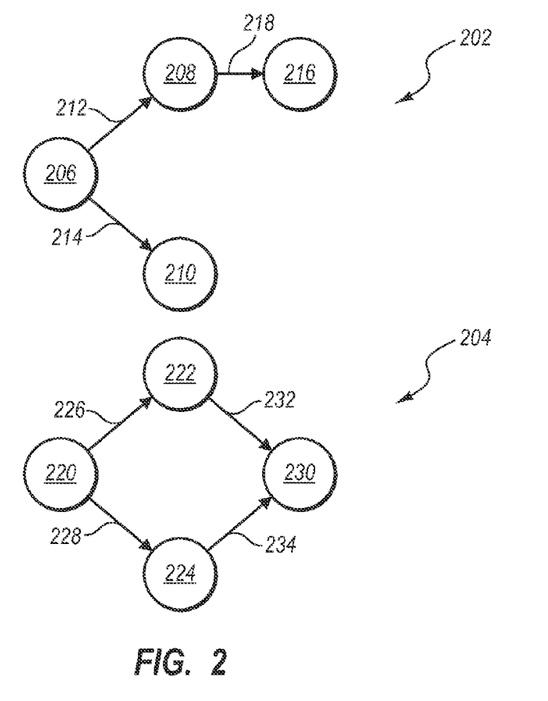
FIG. 2 illustrates a tree and a cyclic graph.
Figure 3:
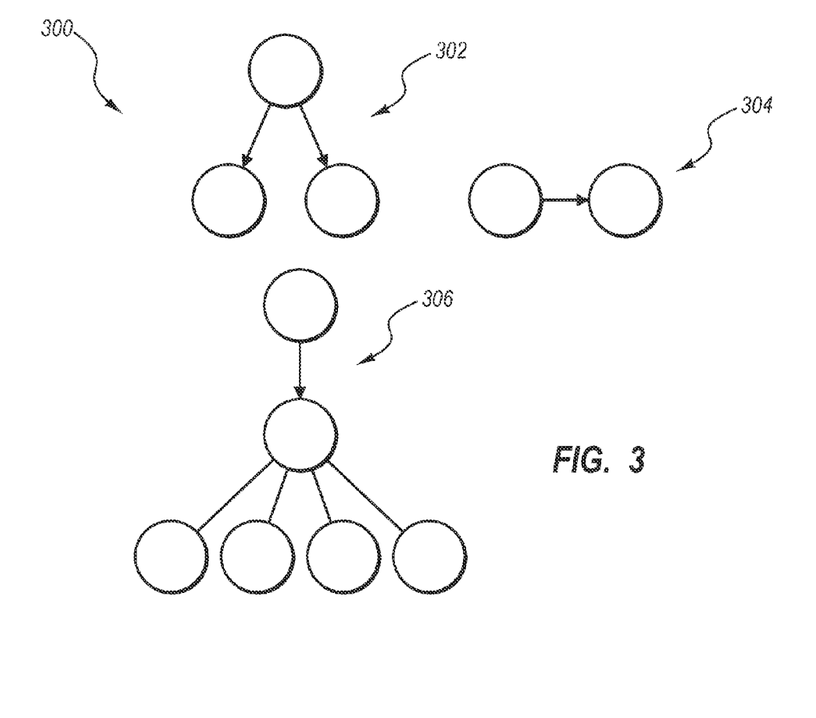
FIG. 3 illustrates a layout forest.

Layouts may be various forms of graphs and/or trees. A tree is a specialized type of graph where any two shapes are connected by exactly one path. Other graphs may have cyclic connections, or more than one path connecting two shapes. Examples of a tree 202 and a graph 204 are illustrated in FIG. 2. The tree 202 illustrated in FIG. 2 has four elements including an element 206 connected to elements 208 and 210 through connections 212 and 214 respectively. Additionally, an element 216 is connected to element 208 through a connection 218. The tree 202 is a graph and a tree, because each of the elements is connected by exactly one path. A disjoint union of trees is a forest. FIG. 3 illustrates a simple forest 300 with three tress 302, 304 and 306.

In contrast, the graph 204, while having some tree-like paths also has non-tree paths. For example, the graph 204 includes an element 220 connected to elements 222 and 224 through connections 226 and 228 respectively. Element 222 is connected to element 230 through connection 232. Element 224 is also connected to element 230 through connection 234. Thus, because there are two paths from element 220 to element 230, this graph 204 is not a tree. However, the paths from 220 to 222 and 220 to 224 are tree-like in that there exists only a single path for each of these relationships.

As will be explained in more detail below, distinguishing between general graph edges and tree edges can be used to perform auto-layout functionality.

Recognizing gestures can be used to determine a user's intent when constructing diagrams. Simple gestures that are recognized include dropping a shape on a diagram surface and connecting a shape to another shape. For example, FIG. 1 illustrates that shapes 104 and 106 can be dropped onto the surface 100 and connected with the connector 108.

These two gestures, i.e. dropping a shape onto a diagram surface and connecting a shape to another shape, are interpreted to build a model graph. At the same time these gestures are used to build a spanning directed forest of the model graph and remember non-tree edges of the model graph in the view state database.

When a user drops a new shape on a diagram surface, in the model space the shape is treated as a new vertex of the model graph. In the view state space the shape is treated as a root vertex of a new directed tree. Each of these directed trees in the view state space can be used to determine appropriate positioning in the model space when additional gestures are made by the user. In particular, trees stored in a view state database can be stored in the database and treated as atomic units and can be moved together without substantial positioning of the elements of the atomic unit with respect to each other.

The following now illustrates an example of view state space and model space interactions to accomplish appropriate positioning, where only tree-like layout patterns are recognized as valid layout patterns. When a user connects two shapes together, in the model space the connection is treated as a new edge of the model graph. In the view state space if the edge connects a source vertex with a root vertex of a directed tree, the edge is treaded as a tree edge and the tree is made a child sub-tree of the source vertex. Otherwise the edge is treaded as a non-tree edge or what is referred to herein as a back link. These rules allow creating simple tree-like layout patterns. And because the layout view state is known and readily available at every step of the process, the view state can be leveraged to create more complex layout patterns.

Other embodiments may recognize other more complex layout patterns, such as cyclic graphs. Additionally other layout rules may be applied.

Figure 4A:
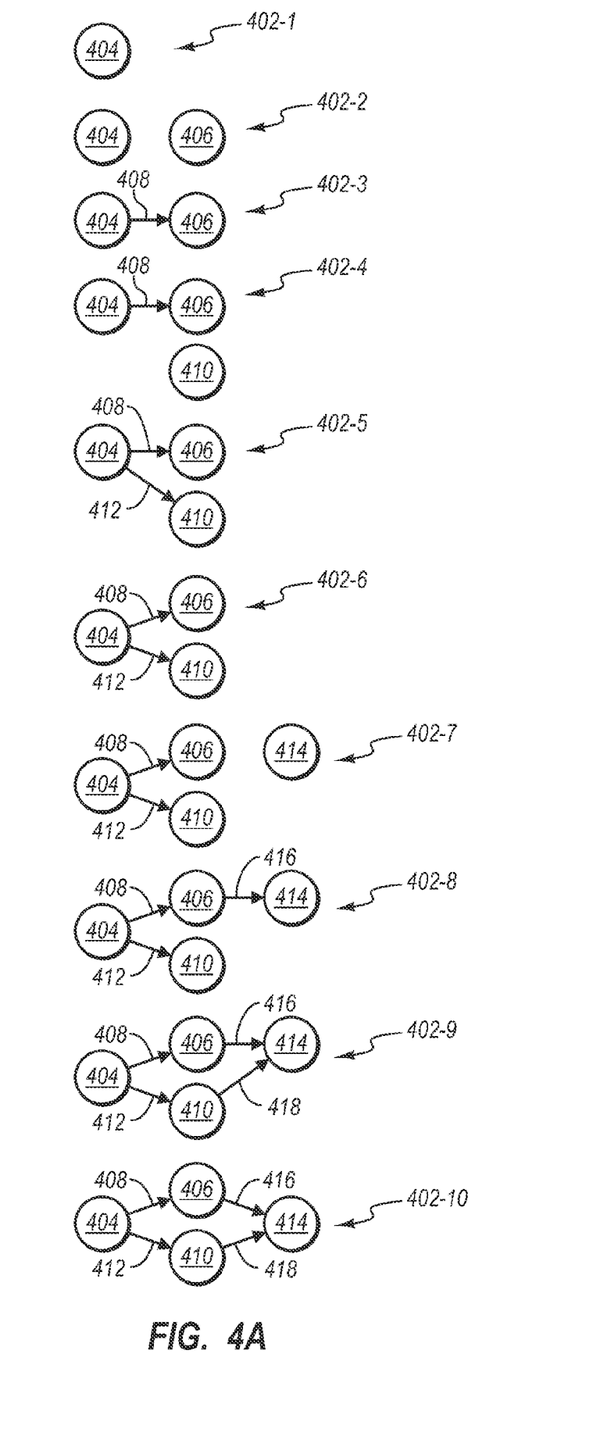
FIG. 4A illustrates a time progression of a layout.

Referring now to FIG. 4A, an example is now illustrated, which includes an example where tree-like patterns are recognized and where cyclic graph patterns are recognized. FIG. 4 illustrates the incremental construction of a view state for a layout 402.

As illustrated at 402-1, a user gesture dropping an element 404 onto a diagram surface of a graphical user interface is illustrated. In the view state space, the element 404 will be recorded as a new vertex of a new tree. In one embodiment, the element 404 may be recorded as a head element of the tree.

Illustrated at 402-2, is a user gesture dropping an element 406 onto the diagram surface. In the view state space, the element 406 will be recorded as a new vertex of a new tree. In one embodiment, the element 406 may be recorded as a head element of the tree in the view state space.

Illustrated at 402-3, is a user gesture connecting the element 404 to the element 406 with a connection 408. In the view state, a tree is recorded which includes a head element 404, a connection 408, and a tail element 406. In some embodiments, the tree may be recorded in the view state database as a head, a BodyTail, and a tail with the connection being implied. At this point, the trees recorded at 402-1 and 402-2 may be cleaned-up from the database as these trees have become part of the tree illustrated at 402-3.

Illustrated at 402-4, is a user gesture dropping an element 410 onto the diagram surface. In the view state space, the element 410 will be recorded as a new vertex of a new tree. In one embodiment, the element 410 may be recorded as a head element of the tree.

Illustrated at 402-5, is a user gesture connecting the element 404 with the element 410 using a connection 412. As illustrated at 402-6, an auto layout module associated with the diagram surface may determine that the tree as illustrated at 402-6 does not match any layout rules or layout patterns specified for optimized layout arrangements. In particular, the layout illustrated at 402-5 includes non-symmetric tree branches. Thus, a programmatic auto-layout module may force the graph illustrated at 402-5 to conform to pre-specified layout rules or to conform to a specified layout pattern as illustrated by the symmetrical tree illustrated at 402-6. Additionally, the tree illustrated at 402-6 is added to the view state space. Clean-up of components trees to the tree illustrated at 402-5 may be performed on the view state database.

Illustrated at 402-7 is a user gesture dropping an element 414 onto the diagram surface. In the view state space, the element 414 will be recorded as a new vertex of a new tree. In one embodiment, the element 414 may be recorded as a head element of the tree.

Illustrated at 402-8 is a user gesture connecting the element 406 to the element 414 with a connection 416. In the view state, a tree is recorded which includes a head element 404 connected to a body element 406 through connection 408 and connected to a body element 410 through connection 412, and a tail element 414 connected to body element 406 through connection 416. Clean-up of component trees to the tree illustrated at 402-8 may be performed on the view state database.

Illustrated at 402-9 is a user gesture connecting the body element 410 with the body element 414 with connection 418. As illustrated at 402-10, an auto layout module associated with the diagram surface may determine that the graph as illustrated at 402-9 does not match any layout rules or layout patterns specified for optimized layout arrangements. In particular, the layout illustrated at 402-5 is a non-symmetric graph. Thus, a programmatic auto-layout module may force the graph illustrated at 402-9 to conform to pre-specified layout rules or to conform to a specified layout pattern as illustrated by the symmetrical graph illustrated at 402-10. Additionally, the graph illustrated at 402-10 is added to the view state space. Clean-up of component trees to the graph illustrated at 402-10 may be performed on the view state database.

As noted previously, had only the tree-like layout patterns been recognized, the connection edge 418 would be treated as a back link and would not affect the view state. A backlink is simply a connection which does not have any additional effect on the layout.

By recognizing more complex layout patterns embodiments can incrementally construct more complex view states, thus improving graph visualization. This recognition process is driven by a declarative set of rules that operate on the model graph and a view state to make layout decisions. The number of patterns that can be recognized and the number of corresponding view states that can be created are virtually unlimited.

Figure 4B:
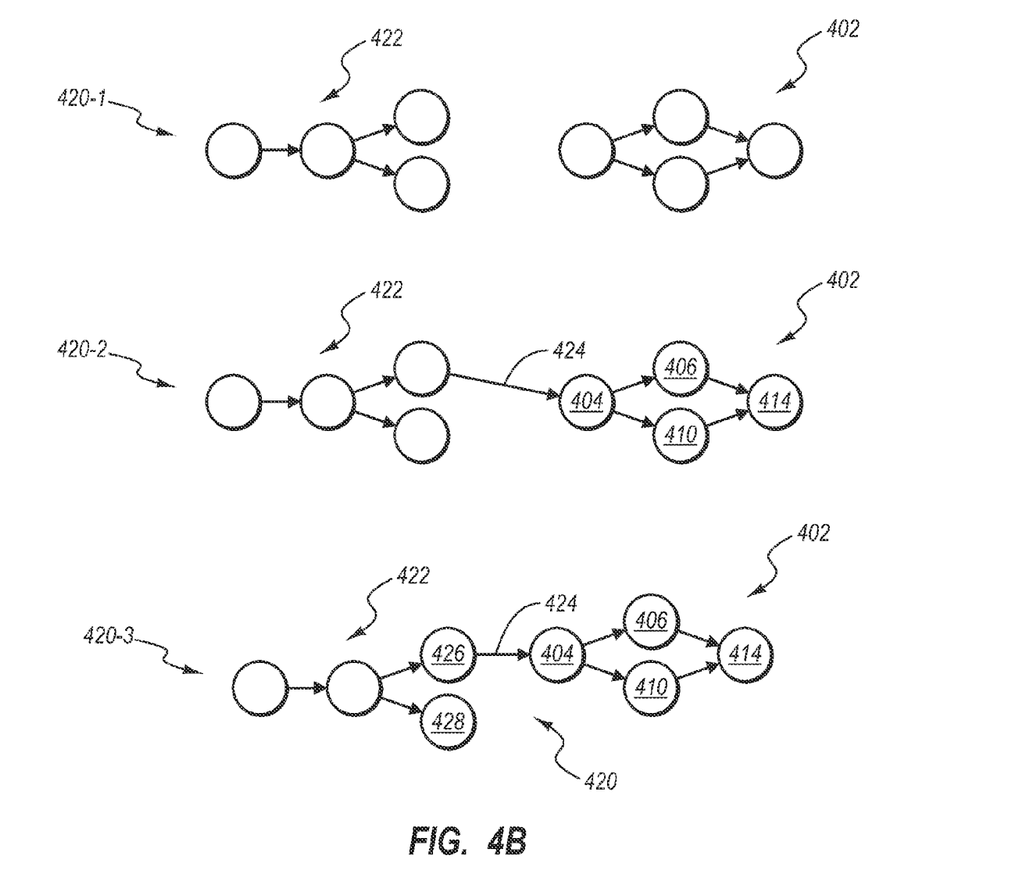
FIG. 4B illustrates auto-layout functionality on a layout in response to gestures.

Referring now to FIG. 4B an example is illustrated where the incremental construction facilitates appropriate auto layout. In particular, FIG. 4B illustrates a composite layout 420 at three different points in time, represented at 420-1, 420-2, and 420-3. At 420-1 a graph 422 and the graph 402 as formed at 402-10 in FIG. 4A are on a diagram surface. Illustrated at 420-2 is a user gesture connecting the graph 422 to the graph 402 by a connection 424. Rather than re-laying out the entire graph 420 using a global layout algorithm which may take into account each of the elements and connections, the graph 402 can be repositioned as an atomic unit with respect to the graph 422. In particular, element 404 will be repositioned to be with respect to element 426 to conform to a recognized tree pattern, but elements 404, 406, 410 and 414 are in substantially the same position with respect to each other as they were before element 404 was repositioned with respect to the graph 422. This is facilitated by the inclusion of the graph 402 in the view state space as an incremental piece. Notably, a new graph 420 may also be stored in the view state space as an incremental piece. The graph 402 may remain in the view state space in the event that further gestures are made require further repositioning of the entire graph 402 (e.g. removal of the connection 424, or an additional connection from element 428 to element 404.

The recognition of layout patterns is incremental and localized such that there is no need to run global graph layout algorithms such as those that can be found in layout research papers and graph layout textbooks. When a user adds or removes shapes the resulting diagram is not perturbed. This may also facilitate embodiments such that when a user switches from one view state to another and then back, the original diagram representation can be reconstructed.

However, embodiments can still leverage graph layout algorithms found in layout research papers and graph layout textbooks when switching from one view state to another for the first time or when importing a graph from an external system that does not have a view state associated with the graph.

In addition to preserving graph layout patterns of various complexities, the view state is used at run-time as a means of layout composition and visualization. The vertexes of a model graph are backed in the view state by layout objects of various types that reflect the complexities of the graph patterns. The simplest form of the layout object type is a tree node object type that is parameterized with an algorithm, using recognized rules and/or patterns, that knows how to layout its children. Every child of the tree node layout object may also be represented by a layout object of some type.

The view state is not static. The layout object types associated with the vertexes of the model graph are also not static. As user modifies a diagram, the view state is also modified. At any step $S_n$ a layout object that represents a specific graph vertex can be dynamically replaced with a layout object of different type. This incremental process may be driven by the following factors:

The layout view state at step $S_{n-1}$

A user gesture at step $S_{n-1}$

The model graph at step $S_n$

The set of declarative rules that operate on the model graph at step $S_n$ and the layout view state at step $S_{n-1}$ to create the layout view state at step $S_n$.

The markup language that allows for flexible layout composition

Embodiments may allow construction of multiple view states in a lock-step. Each view state can be created using a different set of layout rules and layout patterns. When a user switches from one view state to another and back the original diagram can be reconstructed without any loss of information.

Existing systems are usually limited by a pre-defined set of layout algorithms know by the system. Embodiments may be based on an extendable set of layout patterns and layout rules that can be added to the system after the system is deployed. For example, the system may be deployed to recognize only tree patterns. However, additional rules and patterns can be created and later added to the system. For example, if the tree layout patterns only are recognized, the user gesture illustrated at 402-9 will not cause auto layout adjustment because the layout at 402-9 already conforms to a recognized tree layout and because there are no graph layouts or graph rules to violate, no auto-layout adjustment is needed. However, if a declarative rule or layout pattern for a cyclic graph is added to the collection of rules and/or layout patterns, the auto-layout functionality will cause a re-layout as illustrated at 402-10 to conform to the cyclic graph rules and/or layout patterns.

Existing systems usually represent the state of the diagrams using proprietary formats. Layout patterns in some embodiments may be schematized and declaratively expressed by the view state. The view state can be stored in a database in an open format and, as a result, can be consumed by other systems.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 5:
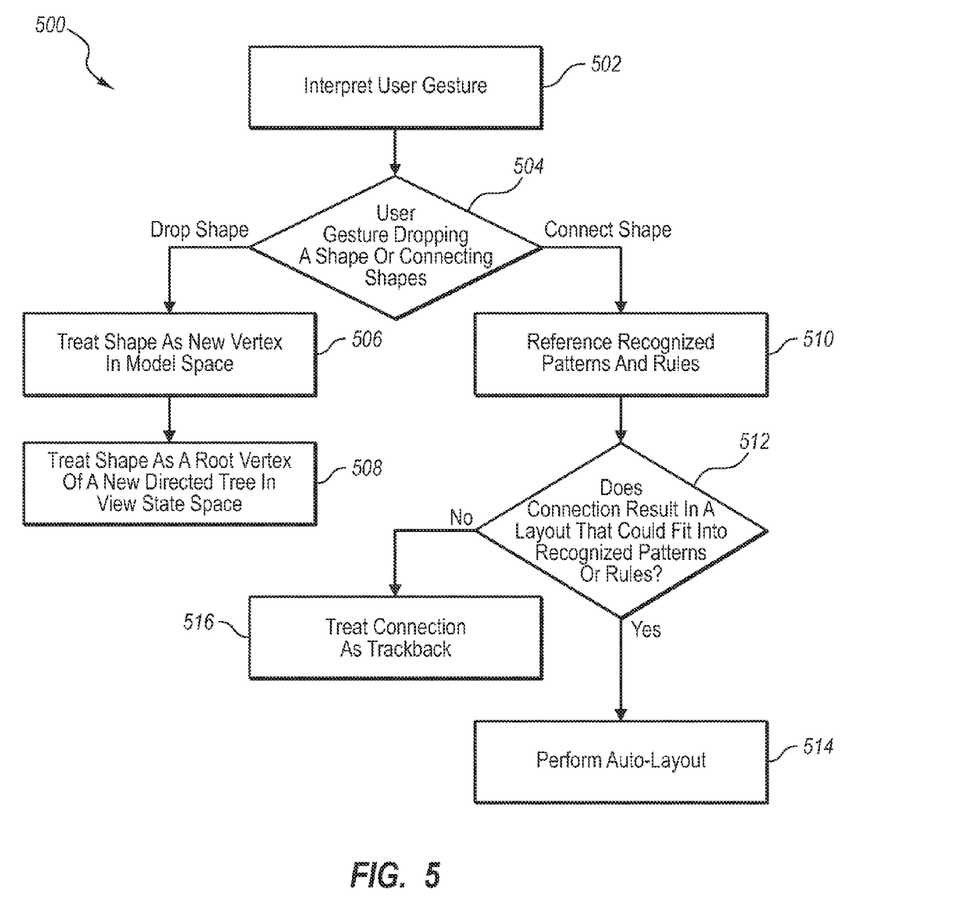
FIG. 5 illustrates a method of performing a layout.

Referring now to FIG. 5, a method 500 is illustrated. The method 500 may be practiced in a computing environment, an in particular, in some embodiments, the method may be implemented by a computer system executing computer executable instructions which cause various actions to be performed by the processor or other portions of the computing system.

The method 500 includes an act of interpreting a user gesture (act 502). For example, a graphical user interface may receive user input dropping a shape or connecting shapes on a diagram surface of the graphical user interface.

The method 500 further includes determining if the user gesture is one dropping a shape onto the surface or one connecting shapes on the surface. If the user gesture is one dropping a new shape onto the surface, the method 500 includes treating the shape as a new vertex in a model space (act 506) and treating the shape as a root vertex of a new directed tree in a view state space (act 508).

If the user gesture is one connecting shapes, then the method includes referencing recognized patterns and/or rules (act 510). The recognized patterns or rules may be declaratively defined patterns or rules which define valid layouts for the diagram surface. A determination is made determining if the connection results in a layout that could fit into the recognized patterns or rules (act 512). For example, a determination may be made to determine if a gesture creates a layout, that, without or without an additional auto-layout being performed, would result in the layout conforming with the recognized patterns or rules. If so, then an auto-layout is performed (act 514) if needed to make the layout conform to the recognized patterns and/or rules, and the new layout is added to the view state (516) where is can later be used in incremental view state layout operations.

If not, then the connection is treated as a back link (act 518).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic a devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of performing diagram layouts, the method comprising a computing system performing the following:
   receiving one or more user input gestures modifying a diagram displayed on a diagram surface, the diagram comprising a first element, a second element, and a plurality of elements connected to the second element laid out in a particular layout pattern with respect to the second element;
   interpreting the one or more user input gestures to be at least one of a gesture connecting the first element to the second element of the diagram or a gesture dropping an element onto the diagram surface; and
   when the one or more gestures is interpreted to be a gesture dropping an element onto the diagram surface, then treating the element as a new vertex in a model space of the diagram surface and treating the element as a root vertex of a new directed tree in a view state space, and when the one or more gestures is interpreted to be a gesture creating a connection connecting the first element to the second element of the diagram, then performing the following:
   referencing at least one of recognized patterns or rules to determine if the connection results in a layout that could fit into the at least one of recognized patterns or rules, and when the connection results in a layout that could fit into the at least one of recognized patterns or rules, then performing an auto-layout on the layout by automatically, and without user intervention, repositioning the second element with respect to the first element but without substantially repositioning the plurality of elements with respect to the second element by moving the second element and the plurality of elements as an atomic unit to cause the auto-layout to conform to the at least one of recognized patterns or rules and adding the auto-layout as a declarative object to a view state such that the auto-layout can be used as an atomic unit in subsequent incremental layout operations taking into account additional user gestures on the diagram surface, else treating the connection as a back link.

2. The method of claim 1, wherein the method further includes:
   storing a first tree for the first element in the view state database;
   storing a second tree for the second element and the plurality of elements in the view state database; and
   storing a new tree for the graph, corresponding to the first element, second element and the plurality of elements in the view state database when the graph matches a recognized rule.

3. The method of claim 2, the new tree comprising an atomic unit that can be used in subsequent incremental layout operations taking into account additional user gestures on the diagram surface.

4. The method of claim 2, wherein moving the second element and the plurality of elements as an atomic unit is performed by using an entry in a view state defining the second element and the plurality of elements as an atomic unit that can be used in subsequent incremental layout operations taking into account additional user gestures on the diagram surface.

5. The method of claim 4, wherein the entry in the view state is defined declaratively.

6. The method of claim 1, wherein the recognized layout rules or patterns are stored in a mark-up format.

7. The method of claim 1, wherein the recognized layout rules or patterns are extendable, such that additional layout rules or patterns can be added to the layout rules or patterns after a system including the diagram surface is deployed.

8. The method of claim 1,
   wherein the backlink is a connection that does not further affect a layout.

9. The method of claim 1, wherein the method further includes:
   receiving a user input gesture modifying a diagram displayed on a diagram surface;
   interpreting the user input gesture to be a gesture dropping an element onto the diagram surface;
   as a result of the one or more gestures being interpreted to be a gesture dropping a first element onto the diagram surface, performing the following:
      displaying the first element on the diagram surface;
      treating the first element as the new vertex in the model space of the diagram surface; and
      treating the first element as the root vertex of the new directed tree in the view state space;
   receiving input connecting the first element to at least one other element in the diagram; and
   cleaning the root vertex of the new directed tree structure from the view state space upon detecting that the first element is connected to the at least one other element in the diagram while to still displaying the element on the diagram surface.

10. The method of claim 9, wherein the view state is stored in a database.

11. The method of claim 9, further comprising:
   receiving another user input gesture which is operable for modifying the diagram displayed on the diagram surface,
   interpreting the user input gesture to be a gesture creating a graph by connecting the first element to the second element of the diagram, the second element being connected to a plurality of elements laid out in a particular layout pattern with respect to the second element;
   performing the auto layout of the diagram by automatically, and without user intervention, repositioning the second element with respect to the first element but without substantially repositioning the plurality of elements with respect to the second element by moving the second element and the plurality of elements as an atomic unit.

12. The method of claim 11, further comprising adding the graph to the view state as an atomic unit that can be used in subsequent incremental layout operations taking into account additional user gestures on the diagram surface.

13. The method of claim 1, wherein moving the second element and the plurality of elements as an atomic unit is performed by using an entry in the view state defining the second element and the plurality of elements as an atomic unit that can be used in subsequent incremental layout operations taking into account additional user gestures on the diagram surface.

14. The method of claim 13, wherein the entry in the view state is defined declaratively.

15. The method of claim 13, wherein the view state is stored in a database.

16. The method of claim 1, wherein the recognized layout rules or patterns are stored in a mark-up format.

17. The method of claim 1, wherein the recognized layout rules or patterns are extendable, such that additional layout rules or patterns can be added to the layout rules or patterns after a system including the diagram surface is deployed.

18. The method of claim 2, wherein the method further includes cleaning the first and second trees from the view state database while still continuing to display the first element, the second element and the plurality of elements on the diagram surface.

19. A computing system comprising:
   at least one processor; and
   one or more storage device having stored computer-executable instructions which, when executed by the at least one processor, implement a method of performing diagram layouts, the method comprising a computing system performing the following:
      receiving one or more user input gestures modifying a diagram displayed on a diagram surface, the diagram comprising a first element, a second element, and a plurality of elements connected to the second element laid out in a particular layout pattern with respect to the second element;
      interpreting the one or more user input gestures to be at least one of a gesture connecting the first element to the second element of the diagram or a gesture dropping an element onto the diagram surface; and
      when the one or more gestures is interpreted to be a gesture dropping an element onto the diagram surface, then treating the element as a new vertex in a model space of the diagram surface and treating the element as a root vertex of a new directed tree in a view state space, and when the one or more gestures is interpreted to be a gesture creating a connection connecting the first element to the second element of the diagram, then performing the following:
      referencing at least one of recognized patterns or rules to determine if the connection results in a layout that could fit into the at least one of recognized patterns or rules, and when the connection results in a layout that could fit into the at least one of recognized patterns or rules, then performing an auto-layout on the layout by automatically, and without user intervention, repositioning the second element with respect to the first element but without substantially repositioning the plurality of elements with respect to the second element by moving the second element and the plurality of elements as an atomic unit to cause the auto-layout to conform to the at least one of recognized patterns or rules and adding the auto-layout as a declarative object to a view state such that the auto-layout can be used as an atomic unit in subsequent incremental layout operations taking into account additional user gestures on the diagram surface, else treating the connection as a back link.

20. One or more hardware storage devices having stored computer-executable instructions which, when executed by the at least one processor, implement a method of performing diagram layouts, the method comprising a computing system performing the following:
   receiving one or more user input gestures modifying a diagram displayed on a diagram surface, the diagram comprising a first element, a second element, and a plurality of elements connected to the second element laid out in a particular layout pattern with respect to the second element;
   interpreting the one or more user input gestures to be at least one of a gesture connecting the first element to the second element of the diagram or a gesture dropping an element onto the diagram surface; and
   when the one or more gestures is interpreted to be a gesture dropping an element onto the diagram surface, then treating the element as a new vertex in a model space of the diagram surface and treating the element as a root vertex of a new directed tree in a view state space, and when the one or more gestures is interpreted to be a gesture creating a connection connecting the first element to the second element of the diagram, then performing the following:
   referencing at least one of recognized patterns or rules to determine if the connection results in a layout that could fit into the at least one of recognized patterns or rules, and when the connection results in a layout that could fit into the at least one of recognized patterns or rules, then performing an auto-layout on the layout by automatically, and without user intervention, repositioning the second element with respect to the first element but without substantially repositioning the plurality of elements with respect to the second element by moving the second element and the plurality of elements as an atomic unit to cause the auto-layout to conform to the at least one of recognized patterns or rules and adding the auto-layout as a view state such that the auto-layout can be used in subsequent incremental layout operations taking into account additional user gestures on the diagram surface, else treating the connection as a back link.

* * * * *